(12) United States Patent
Schoening et al.

(10) Patent No.: US 8,326,492 B2
(45) Date of Patent: Dec. 4, 2012

(54) PARK-STEERING ASSISTANCE SYSTEM HAVING AN IMPROVED SWITCH-ON AND SWITCH-OFF LOGIC

(75) Inventors: Volkmar Schoening, Wedemark (DE);
Ulrich Wuttke, Braunschweig (DE);
Frank Schwitters, Koenigslutter (DE)

(73) Assignee: Volkswagen AG, Wolfsburg (DE)

( * ) Notice: Subject to any disclaimer, the term of this patent is extended or adjusted under 35 U.S.C. 154(b) by 614 days.

(21) Appl. No.: 12/517,527

(22) PCT Filed: Nov. 26, 2007

(86) PCT No.: PCT/EP2007/010245
§ 371 (c)(1),
(2), (4) Date: Nov. 23, 2009

(87) PCT Pub. No.: WO2008/067927
PCT Pub. Date: Jun. 12, 2008

(65) Prior Publication Data
US 2010/0070138 A1    Mar. 18, 2010

(30) Foreign Application Priority Data
Dec. 5, 2006   (DE) .................. 10 2006 057 230

(51) Int. Cl.
*A01B 69/00* (2006.01)
(52) U.S. Cl. ............ 701/42; 701/37; 701/96; 340/932.2
(58) Field of Classification Search ............ 701/37, 701/41–42, 96, 117, 301, 48; 340/932.2, 340/435
See application file for complete search history.

(56) References Cited

U.S. PATENT DOCUMENTS

| 6,265,968 B1 | 7/2001 | Betzitza et al. |
| 2004/0130464 A1* | 7/2004 | Schindler et al. .......... 340/932.2 |
| 2006/0139181 A1 | 6/2006 | Danz et al. |

FOREIGN PATENT DOCUMENTS

| DE | 198 06 150 | 9/1999 |
| DE | 102 57 722 | 7/2004 |
| DE | 10 2004 035 537 | 5/2006 |
| DE | 10 2004 055 371 | 5/2006 |
| EP | 0 952 460 | 10/1999 |
| EP | 1 626 383 | 2/2006 |
| WO | WO 2005/100134 | 10/2005 |
| WO | WO 2006/048309 | 5/2006 |

OTHER PUBLICATIONS

International Search Report, PCT/EP2007/010245 dated Mar. 28, 2008.

* cited by examiner

*Primary Examiner* — Thomas Black
*Assistant Examiner* — Luke Huynh
(74) *Attorney, Agent, or Firm* — Kenyon & Kenyon LLP (57) ABSTRACT

A park-steering assistance system and method for operating a park-steering assistance system includes a switch-on and switch-off logic, which is provided to activate the park-steering assistance system as a function of a signal of a control element and to deactivate the park-steering assistance system as a function of a velocity value of the motor vehicle and as a function of a specified first velocity threshold value, a specified second velocity threshold value existing, which is lower than the first velocity threshold value, and the switch-on and switch-off logic being arranged to switch the park-steering assistance system from the activated state to a temporarily deactivated state or from the temporarily deactivated state to the activated state as a function of a comparison of the variables of the velocity value and the second velocity threshold value.

10 Claims, 7 Drawing Sheets

PARK-STEERING ASSISTANCE SYSTEM HAVING AN IMPROVED SWITCH-ON AND SWITCH-OFF LOGIC

FIELD OF THE INVENTION

The present invention relates to a method for operating a park-steering assistance system and to a park-steering assistance system having an improved switch-on and switch-off logic, the park-steering assistance system providing a driver with assistance functions and/or services in connection with driving a motor vehicle into and/or out of a parking space. The park-steering assistance system includes a switch-on and switch-off logic, which is provided to activate the park-steering assistance system as a function of a signal of a control element and to deactivate the park-steering assistance system as a function of a velocity value of the motor vehicle and as a function of a specified first velocity threshold value.

BACKGROUND INFORMATION

Park-steering assistance systems belong to a group of driver assistance systems that are increasingly used in vehicles in order to increase convenience and/or improve safety. The simplest driver assistance systems are for example an anti-lock braking system (ABS system), which prevents vehicle wheels from locking when braking. Other driver assistance systems include, for example, an electronic stability program (ESP system), which specifically brakes individual wheels in critical driving situations so as to maintain a vehicle's tracking, i.e. to prevent the vehicle from swerving.

Park-steering assistance systems are also among the driver assistance systems increasingly used in motor vehicles. In a simple arrangement, a park-steering assistance system ensures that the surroundings of the vehicle are searched with the aid of sensors for obstacles and/or free spaces. Preferably a surroundings map is produced that indicates on a display device obstacles and free areas in the surroundings of the vehicle. In a particularly simple arrangement, the representation takes the form of several light-emitting elements that represent a distance of the vehicle from an obstacle.

If the vehicle proceeds past a specified limit distance, a haptic, acoustic and/or visual warning is issued to the driver. More highly developed park-steering assistance systems are able to detect and measure parking spaces automatically, calculate a trajectory for the vehicle to follow into the ascertained parking space, and even drive the vehicle automatically into the parking space.

PCT International Published Patent Application No. WO 2005/100134 describes such a park-steering assistance system which provides for the park-steering assistance system to be deactivated if a safety check has determined that a parking process cannot be performed safely. The safety check verifies among other things whether the park-steering assistance system works correctly, i.e. does not issue an error message, whether a steering actuator works correctly, i.e. does not report an error, whether the communication system between the park-steering assistance system and the steering actuator works correctly, i.e. does not reveal an error, and whether an automatic steering intervention is requested.

European Published Patent Application No. 1 626 383 describes a method and a device for supporting a maneuvering of a motor vehicle. The device and method are provided in order to increase convenience and safety when a vehicle slowly approaches an obstacle, as occurs for example when parking. This is achieved by providing for the clutch to be opened at least partially in a maneuvering mode if a specified distance between the motor vehicle and an obstacle is undershot. The event of a vehicle velocity falling below a specified entry limit velocity combined with an accelerator pedal angle smaller than a specified entry limit angle is provided as an entry criterion that effects an automatic activation of the maneuvering mode.

Conventional park-steering assistance systems of the type mentioned at the outset provide for the park-steering assistance system to be capable of being activated via an operation of a control element. Since an accuracy, for example in measuring the surroundings for finding parking spaces, is a function of the vehicle velocity, conventional systems provide for the park-steering assistance system to be deactivated if a velocity value of the vehicle exceeds a first velocity threshold value. This arrangement is based on the assumption that, following the activation of the park-steering assistance system, a driver will approach a possible parking space with his vehicle at a relatively low vehicle velocity. In practice, the first velocity threshold value is usually fixed at 30 km/h.

If the vehicle velocity exceeds this first velocity threshold value, for example 30 km/h, then the park-steering assistance system is deactivated. Since there are situations in which a driver, without abandoning his search for a parking space or his intention to approach a parking space, must possibly increase his vehicle velocity to above 30 km/h, i.e. above the first velocity threshold value, it is unsatisfactory that he must manually reactivate the park-steering assistance system after having lowered the vehicle velocity again below the first velocity threshold value.

SUMMARY

Example embodiments of the present invention provide a park-steering assistance system and a method for operating a park-steering assistance system which offer a higher degree of convenience with respect to switching the park-steering assistance system on and off.

For this purpose, a provision is made for the creation of a temporarily deactivated state of the park-steering assistance system in addition to the activated state and the deactivated state. Furthermore, a second velocity threshold value is specified, which is lower than the first velocity threshold value. The park-steering assistance system may be switched from the activated state to the temporarily deactivated state or from the temporarily deactivated state to the activated state as a function of a comparison of the variables of the vehicle velocity and the second velocity threshold value. A deactivation occurs only at a higher vehicle velocity.

In particular, a park-steering assistance system having an improved switch-on and switch-off logic is provided, the park-steering assistance system providing a driver with assistance functions and/or services in connection with driving a motor vehicle into and/or out of a parking space, including the parking and deparking logic that is provided to activate the park-steering assistance system as a function of a signal of a control element and to deactivate the park-steering assistance system as a function of a velocity value of the motor vehicle and as a function of a specified first velocity threshold value, a specified second velocity threshold value existing, which is lower than the first velocity threshold value, and the switch-on and switch-off logic being designed to switch the park-steering assistance system from the activated state to a temporarily deactivated state or from the temporarily deactivated stat to the activated state as a function of a comparison of the variables of the velocity value and the second velocity threshold value.

A method for operating such a park-steering assistance system having a switch-on and switch-off logic includes: detecting a control signal and switching the park-steering assistance system to an activated state upon receiving the control signal, receiving a velocity signal that represents a velocity value of the motor vehicle, comparing the velocity value to a specified first velocity threshold value and switching the park-steering assistance system to a deactivated state as a function of the result of the comparison, a specified second velocity threshold value existing, which is lower than the first velocity threshold value, and the switch-on and switch-off logic performing a comparison of the variables of the velocity value and the second velocity threshold value and switching the park-steering assistance system from the activated state to a temporarily deactivated state or from the temporarily deactivated state to the activated state as a function of the comparison of the variables.

This makes it possible for the second velocity threshold value to be defined such that an optimum functioning of the park-steering assistance system is ensured below the second velocity threshold value and that the activated park-steering assistance system, in the event that the velocity exceeds the second velocity threshold value only briefly, is automatically reactivated after falling below it. Only when the first velocity threshold value is exceeded, which is greater than the second velocity threshold value, is the park-steering assistance system completely deactivated. A greater convenience is thereby created for the driver who briefly increases his velocity above the second velocity threshold value while searching for a parking space.

If the vehicle moves at a velocity that fluctuates around the velocity corresponding to the second velocity threshold value, then the switch-on and switch-off logic alternately switches the park-steering assistance system in brief intervals to the activated and to the temporarily deactivated state. If in the activated state, for example, a surroundings of the motor vehicle, which is detected by sensors, is displayed and this display is switched off in the temporarily deactivated state, then in such a case a "fluttering" of the display sets in. To prevent this state, example embodiments of the present invention provide for the existence of a specified third velocity threshold value, which is lower than the second velocity threshold value, and for the switch-on and switch-off logic to be designed to switch the park-steering assistance system from the temporarily deactivated state to the activated state only when the velocity value is also lower than the third velocity threshold value. This produces a hysteresis as a function of the vehicle velocity or the velocity value for a switch between the activated state and the temporarily deactivated state.

There is a velocity range, in which a measurement of the surroundings by sensors is no longer able to provide a sufficient accuracy for an exact measurement of the surroundings, but that the park-steering assistance system, however, may still provide a limited functionality for increasing the convenience for a driver. This may include, for example, a display of an already exactly measured surroundings region of the motor vehicle. Example embodiments of the present invention provide for the existence of a fourth velocity threshold value, which is lower than the second velocity threshold value, and for the switch-on and switch-off logic to be designed to switch the park-steering assistance system from the activated state to a state activated in a limited manner if the velocity value reaches or exceeds the fourth velocity threshold value. This example embodiment has the further result that the velocity threshold, at which the park-steering assistance system is switched to the temporarily deactivated state, is raised above the velocity, up to which a flawless and optimum functioning of the park-steering assistance system is ensured. Hence, in example embodiments of the present invention in which a switch of the park-steering assistance system to the temporarily deactivated state is provided in a hysteresis-like manner, this makes it possible to raise the velocity threshold at which the park-steering assistance system is switched (back) from the temporarily deactivated state to the activated state.

In example embodiments, the third velocity threshold value and the fourth velocity threshold value coincide. This means that a transition from the activated state to the state activated in a limited manner occurs upon exceeding the velocity threshold value, at the undershooting of which the park-steering assistance system is switched from the temporarily deactivated state to the activated state. The velocity threshold, at which a change occurs between the activated state and the state activated in a limited manner, may be provided in a hysteresis-like manner. This is normally not necessary, however, since the limited functionality may be selected precisely such that for a driver no unpleasant, perceivable switching process are provided, which occur when moving the vehicle at velocities that fluctuate around this velocity threshold. Thus the display of the detected surroundings remains switched on, for example. The information about the surroundings detected by the sensors, however, is categorized as not trustworthy if the park-steering assistance system is in the state that is activated in a limited manner. It is also possible to switch off the sensors in the state that is activated in a limited manner.

As already explained above, there are situations in which a driver wants to park the vehicle and has activated the park-steering assistance system and nevertheless he briefly must or wants to move his vehicle at a higher vehicle velocity. This occurs, for example, when a driver, who is searching for a parking space on the side of a roadway, must cross the area of an intersection in which there naturally cannot be any parking spaces. The driver will drive through this intersection zone swiftly. In this case it may happen that the driver increases the vehicle velocity to such an extent that the velocity value of the vehicle is above the first velocity threshold value, which results in the park-steering assistance system being switched off, i.e. deactivated entirely. To prevent this, example embodiments of the present invention provide for the existence of a specified first time interval and for the switch-on and switch-off logic to be designed to perform the switch to the deactivated state only if the velocity value exceeds the first velocity threshold value for a time span that is longer than the first time interval. The ascertained time span thus indicates how long the motor vehicle is moved uninterruptedly at a velocity above the first velocity threshold value.

If the park-steering assistance system is used for leaving a parking space, then it is desirable that the park-steering assistance system is switched off automatically when the driver, having left the parking space, moves swiftly in road traffic. This is achieved whenever the first velocity threshold value is exceeded, if applicable for the specified time span that is greater than the first time interval.

The functionality of the park-steering assistance system, however, is no longer available to the driver from the time at which the velocity value exceeded the second velocity threshold value. Particularly in city traffic there may be situations in which the driver moves the vehicle at a velocity that is above the second velocity threshold value, but initially does not exceed the first velocity threshold value. To avoid another change from the temporarily deactivated state to the activated state or the state activated in a limited manner, example embodiments of the present invention provide for the existence of a specified second time interval and for the switch-on and switch-off logic to be designed so that the switch from the temporarily deactivated state to the activated state or the state activated in a limited manner occurs only if the velocity value falls below the second velocity threshold value or, if the third velocity threshold value exists, also falls below the third velocity threshold value for another time span that is longer than the second time interval. If in such a situation of leaving a parking space, the motor vehicle initially moves only at a velocity that only effects a switch to the temporarily deactivated state of the park-steering assistance system, and subsequently moves again at a lower speed, which "properly" would effect a switch to the activated state, the vehicle may be moved for another time span that is shorter than the second time interval, without the park-steering assistance system being again switched to the activated state.

The features of the additional example embodiments of the method have the same or similar advantages as the corresponding features of the park-steering assistance system.

Example embodiments of the present invention are explained in more detail in the following with reference to the figures.

DETAILED DESCRIPTION

Figure 1:
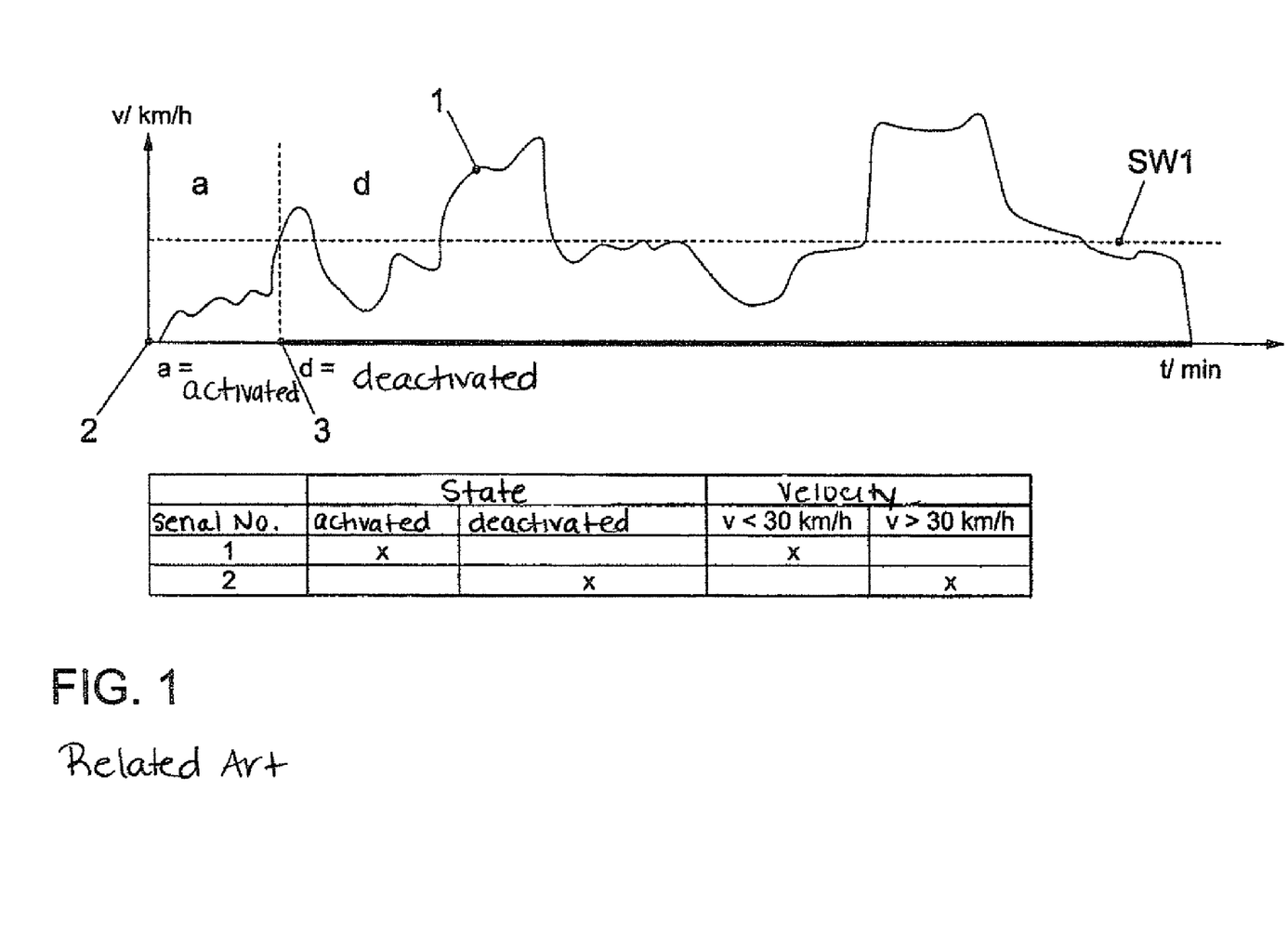
FIG. 1 is a graphical representation of a vehicle velocity plotted against time and a table for illustrating how a park-steering assistance system is switched on and off according to conventional arrangements.

In FIG. 1, a velocity value v of a motor vehicle is plotted graphically as curve 1 against time. At a start time 2, a park-steering assistance system is in or is switched to an activated state. At a time 3, the vehicle velocity exceeds a first velocity threshold value SW1. At this time, the park-steering assistance system is switched from the activated to a deactivated state. Irrespective of how the velocity value v of the motor vehicle develops over time, the park-steering assistance system according to conventional arrangements remains in the deactivated state.

The lower part of FIG. 1 shows a table. The individual rows of the table show different driving states. A column block under the heading "Status" lists the different possible operating states of the park-steering assistant. Another column block under the heading "Velocity" lists the different velocity ranges corresponding to the different operating states of the park-steering assistant. Crosses indicate correlations between the velocities and the operating states.

Figure 2:
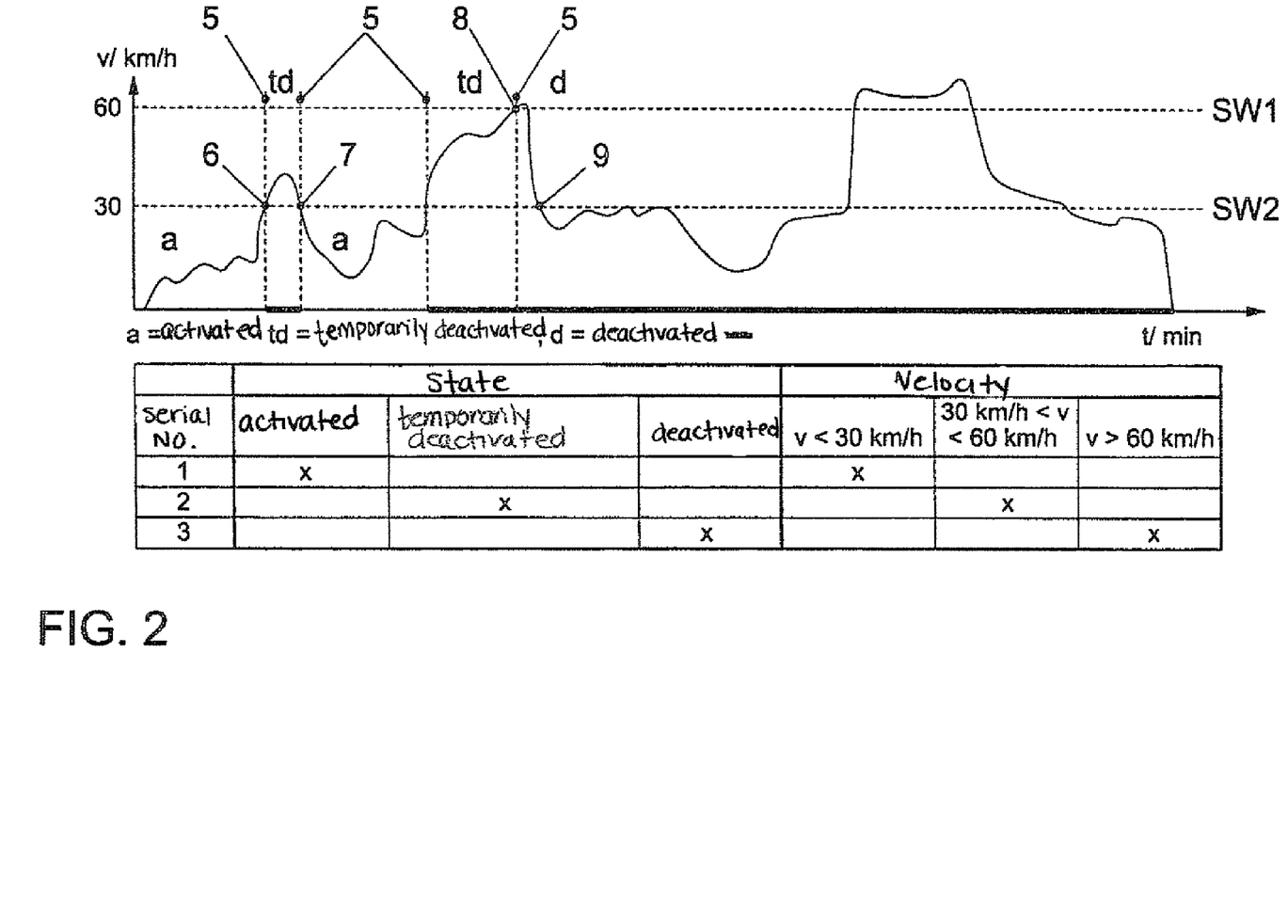
FIGS. 2 through 6 are in each case a graphical representation of the vehicle velocity plotted against time and a table for illustrating the switchover between different operating states in different example embodiments of a park-steering assistance system and respectively a corresponding table for illustrating the switchover between the different operating states.

In FIG. 2, as in the remaining FIGS. 3 through 6, velocity v of a motor vehicle is plotted against time as a velocity curve 1. The velocity curve is identical in all FIGS. 1 through 6. Different time segments are delimited in the graphical representation by vertical reference lines 5. These reference lines 5 respectively mark a time at which velocity curve 1 exceeds or falls below a velocity threshold value or delimits a time interval. Time segments thus delimited respectively have assigned to them, via a letter or a letter combination, a name of an associated operating state of the park-steering assistance system. Here "a" stands for activated, "d" for deactivated, "td" for temporarily deactivated and "ae" stands for activated in a limited manner.

In the example embodiment of a park-steering assistance system corresponding to the graphical representation shown in FIG. 2, a first velocity threshold value SW1 of 60 km/h and a second velocity threshold value SW2 of 30 km/h are specified. If the park-steering assistance system is in an activated state and velocity value v exceeds second velocity threshold value SW2, as is the case, for example, at a time 6, then the park-steering assistance system is switched from the activated state to a temporarily deactivated state. If the velocity value v of the motor vehicle falls again below second velocity threshold value SW2, as is the case at the single point 7, then the park-steering assistance system is again switched to the activated state. If at any time 8, however, velocity value v exceeds first velocity threshold value SW1, then the park-steering assistance system is switched to the deactivated state. Even after reduction of the velocity value below second velocity threshold value SW2, as occurs at a point 9 for example, the park-steering assistance system is not switched back to the activated state.

Figure 3:
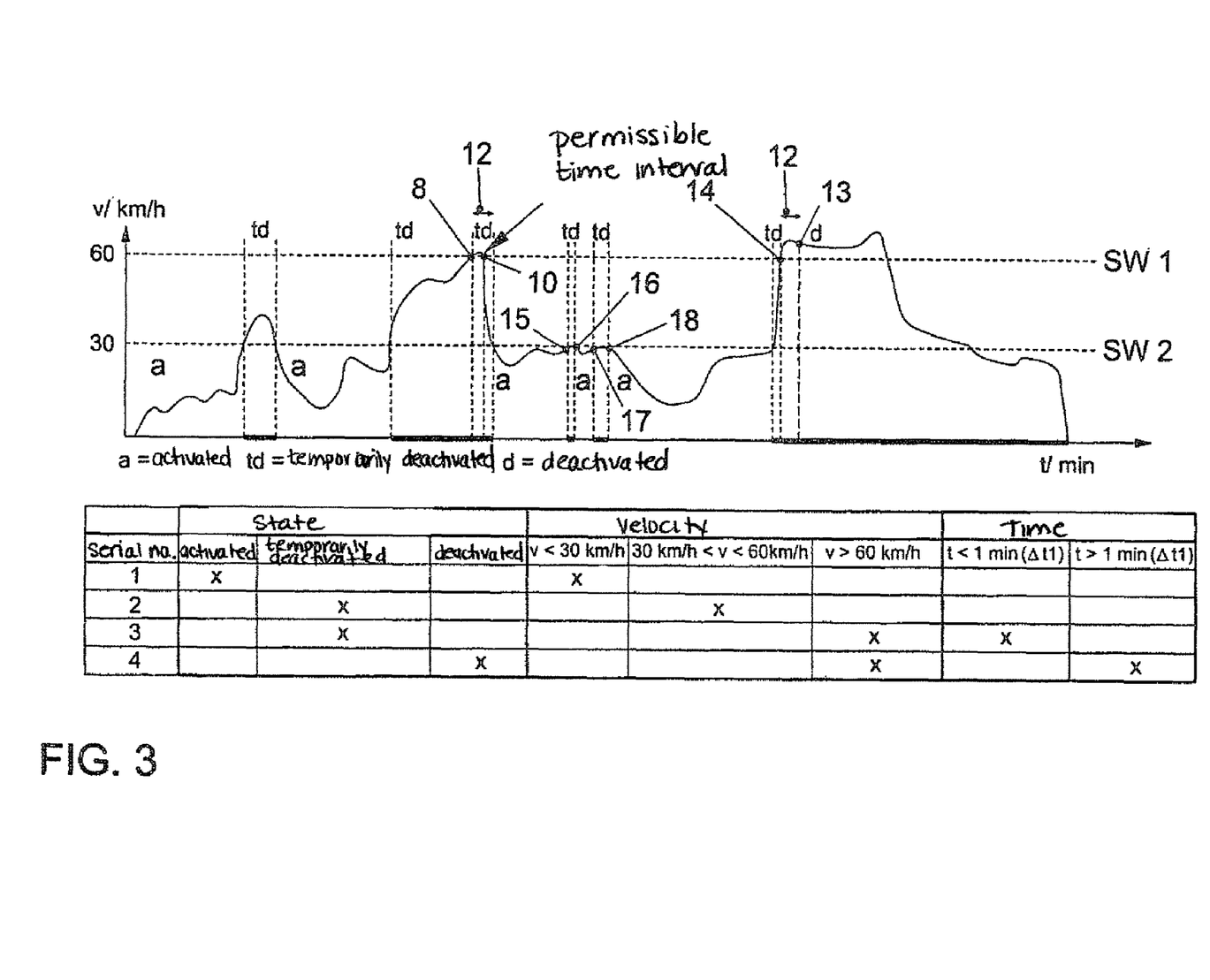

The park-steering assistance system corresponding to the graphical representation in FIG. 3 is designed such that the park-steering assistance system is deactivated only if velocity value v exceeds first velocity threshold value SW1 for a time span that is greater than a first time interval $\Delta t1$. In the example shown in FIG. 3, a time span between time 8, at which velocity curve 1 exceeds first velocity threshold value SW1, and a time 10, at which velocity curve 1 again falls below first velocity threshold value SW1, is shorter than first time interval $\Delta t1$, which is shown by a double arrow 12. At time 9, at which the velocity curve again falls below second velocity threshold value SW2, the corresponding park-steering assistance system is thus switched from the temporarily deactivated state to the activated state. Only at a time 13 has a time span elapsed since first velocity threshold value SW1 was exceeded at a time 14, which time span corresponds to first time interval $\Delta t1$ indicated by a double arrow 12.

Only at this time 13 is the park-steering assistance system thus switched to the deactivated state.

The example embodiment shows that at times 15, 16, 17, 18, which follow one another in rapid succession, an alternating switch occurs at each instant from the activated state to the temporarily deactivated state and from the temporarily deactivated state to the activated state. This may cause an unpleasant "fluttering" of a display for example if in the activated state for example a surroundings of the motor vehicle is displayed and this is switched off in the temporarily deactivated state.

Figure 4:
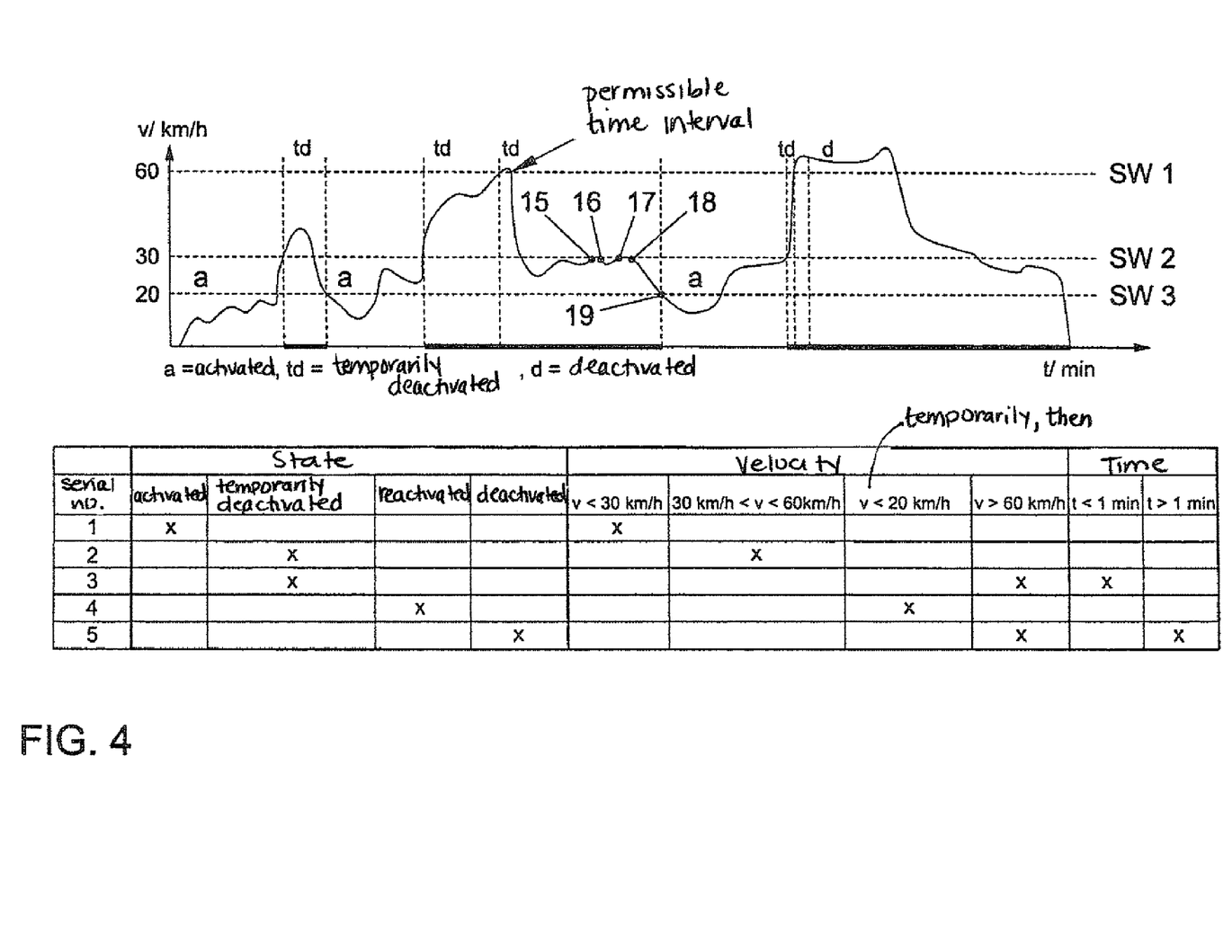

In example embodiments of the park-steering assistance system, which corresponds to the representation shown in FIG. 4, this problem is solved. The relevant example embodiment of the park-steering assistance system has a third velocity threshold value SW3. It is lower than second velocity threshold value SW2. This prevents a constant switchover between the activated and temporarily deactivated state at times 15, 16, 17, 18. A switch back to the activated state occurs only at a time 19, at which the velocity curve falls below third velocity threshold value SW3.

Figure 5:
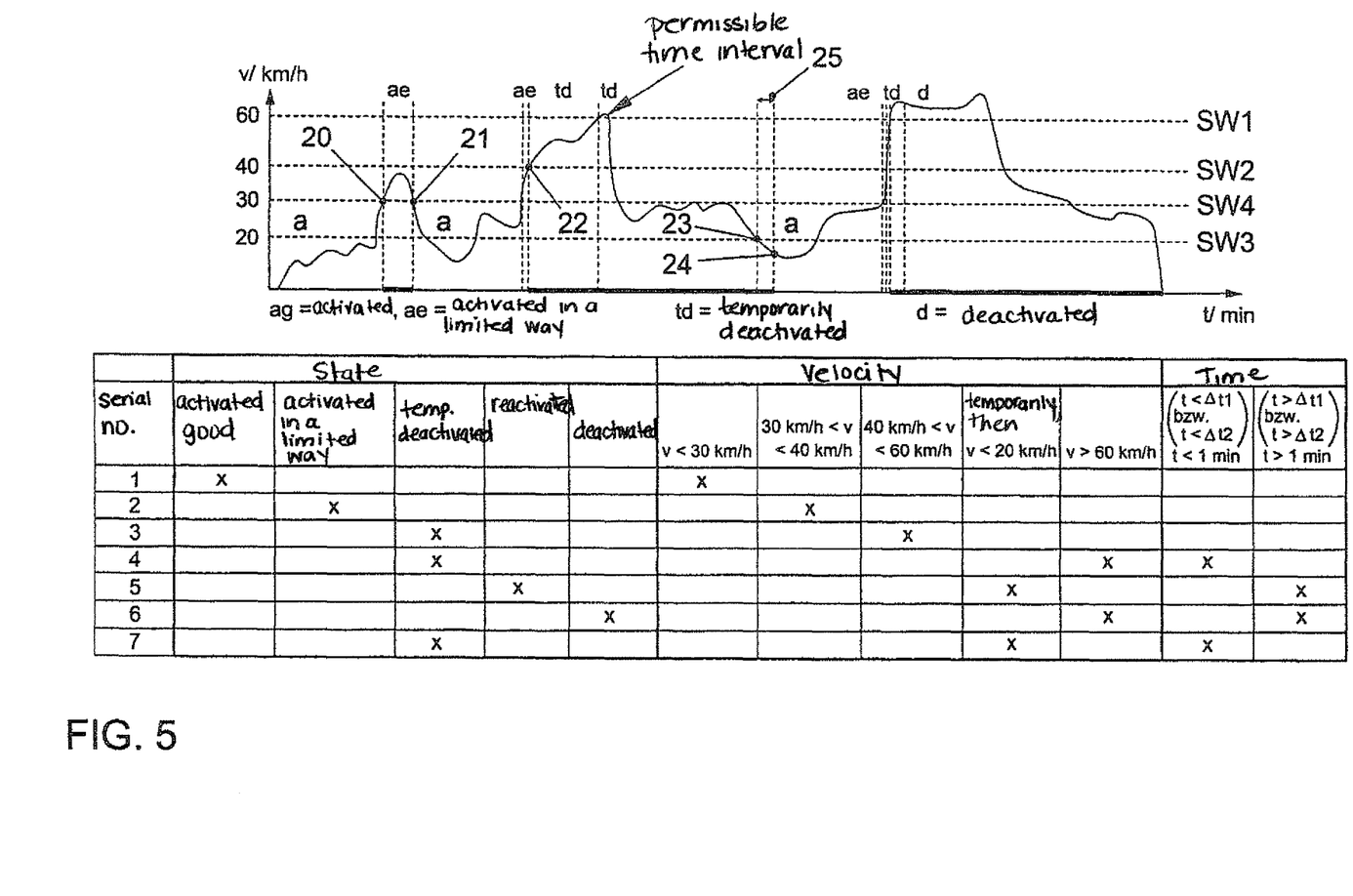

The example embodiment of a park-steering assistance system corresponding to the representation of FIG. 5 is arranged such that it provides an, albeit limited, park-steering assistance functionality even at higher velocities. For this purpose, the example embodiment features a fourth velocity threshold value that is lower than the second velocity threshold value. The fourth velocity threshold value is preferably defined such that it coincides with the velocity value of the vehicle up to which an unlimited functionality of the park-steering assistance system may be provided. This means that up to this velocity for example a measurement of a surroundings of the vehicle has a sufficient precision in order to be able to utilize the information thus obtained for automatically parking the motor vehicle. At velocities that lie above the fourth velocity threshold value up to reaching the second velocity threshold value, there is a provision for the park-steering assistance system to provide a limited functionality in a state activated in a limited manner. The ascertained surroundings may continue to be displayed for example. A representation of surrounding regions, as were ascertained at a velocity above the fourth velocity threshold value, however, may be eliminated entirely or may be represented in a marked way that indicates that the ascertained and represented information about obstacles and free areas have only a limited informational value or reliability.

In this example embodiment, a switch is performed from the activated state to the state activated in a limited way at a time 20 at which velocity curve 1 exceeds fourth velocity threshold value SW4. At a time 21, at which the velocity curve again falls below fourth velocity threshold value SW4, the system switches back to the activated state. The state activated in a limited manner is differentiated in the graph by a letter combination ae from the activated state, which is indicated by the letter a. In this example embodiment, third velocity threshold value SW3 is smaller than fourth velocity threshold value SW4. The park-steering assistance system is switched to the temporarily deactivated state at a time 22, at which velocity curve 1 exceeds second velocity threshold value SW2. In this example embodiment, a transition to the activated state does not occur at a time 23, at which velocity value v, i.e. velocity curve 1, falls below third velocity threshold value SW3, but rather occurs only at a time 24. Between time 23 and time 24, another time span has elapsed that is greater than a second time interval Δt2, which is indicated by a double arrow 25. Particularly in driving situations in which, having left the parking space, the vehicle cannot be accelerated immediately to a velocity above first velocity threshold value SW1, this makes it possible to prevent the park-steering assistance system from being switched on again, i.e. switched to the activated state, if the vehicle velocity falls only briefly below the third velocity threshold value.

The values chosen in the example embodiment of FIG. 5 for first velocity threshold value SW1 of 60 km/h, for second velocity threshold value SW2 of 40 km/h, third velocity threshold value SW3 of 20 km/h and fourth velocity threshold value SW4 of 30 km/h have the result that the park-steering assistance system, after having been switched to the temporarily deactivated state, is reactivated at a velocity that is too low.

Figure 6:
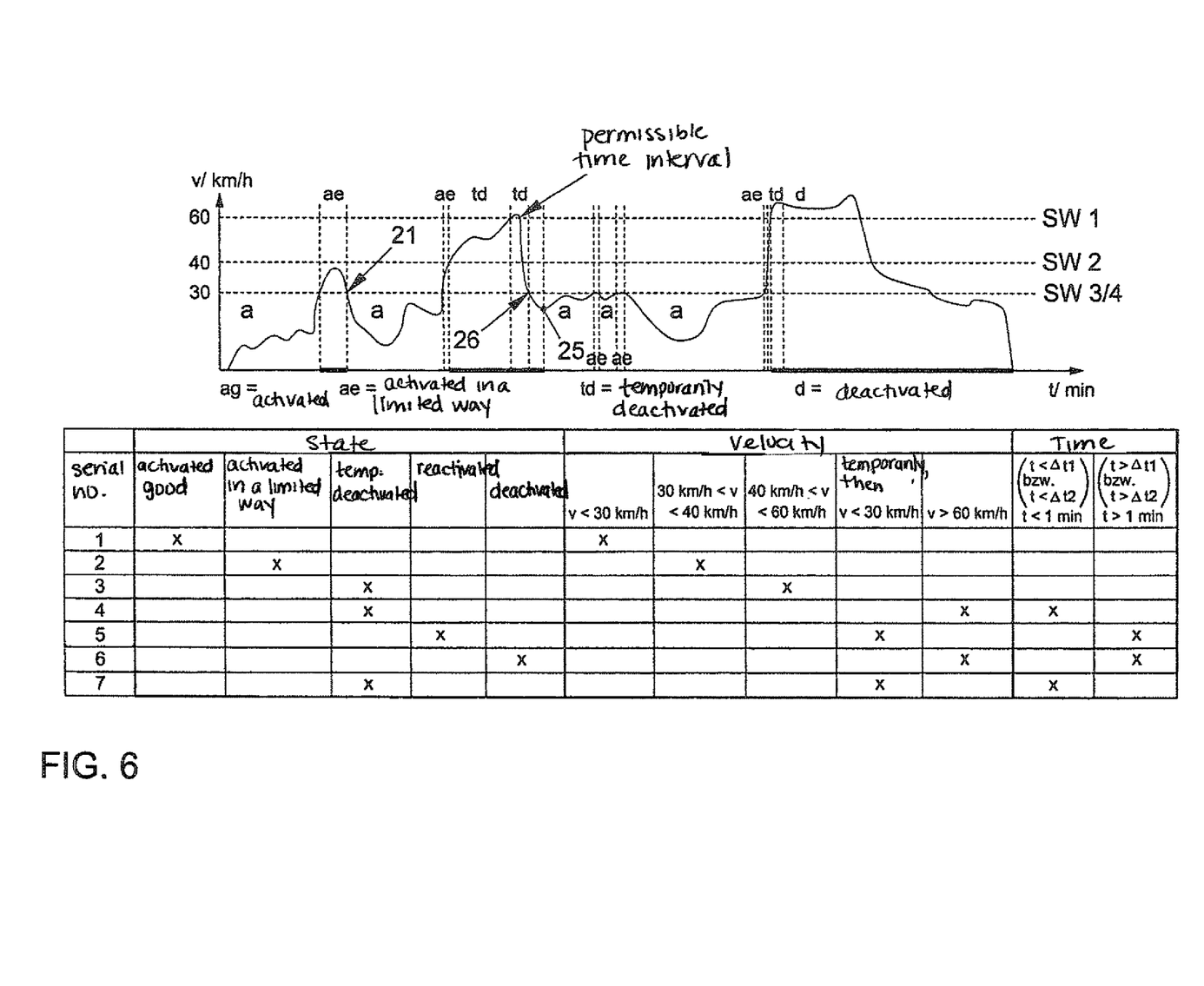

Therefore, in an example embodiment corresponding to the graphical representation in FIG. 6, third velocity threshold value SW3 and fourth velocity threshold value SW4 are selected to be identical at 30 km/h. This means that a switch to the activated state occurs both at time 21 from the state activated in a limited manner as well as at a time 25 from the temporarily deactivated state when the same velocity value is undershot. In this regard, however, one must take into account that a switch-on and switch-off logic in the present example embodiment effects a switch to the activated state at time 25 only at a time at which another time span has passed since a time 26, which is greater than a second time interval Δt2. The relevant third velocity threshold value SW3 is actually undershot already at time 26. First time interval Δt1 and second time interval Δt2 may be defined independently of each other. In the represented example embodiments they are defined identically as one minute.

The different individual features of the various example embodiments may be combined in any manner desired. The represented embodiments thus merely represent exemplary embodiments. For example, third velocity threshold value SW3 may be selected to be greater or smaller than fourth velocity threshold value SW4. In the first case, the switch-on and switch-off logic switches the park-steering assistance system from the temporarily activated state to the state activated in a limited manner, in the second case to the activated state. Example embodiments may also be implemented in which only the fourth velocity threshold value SW4 exists, but not the third velocity threshold value SW3. In this example embodiment, a switch occurs from the temporarily deactivated state to the state activated in a limited manner directly or following the expiration of another time span since undershooting fourth velocity threshold value SW4, which time span is greater than second time interval Δt2.

Figure 7:
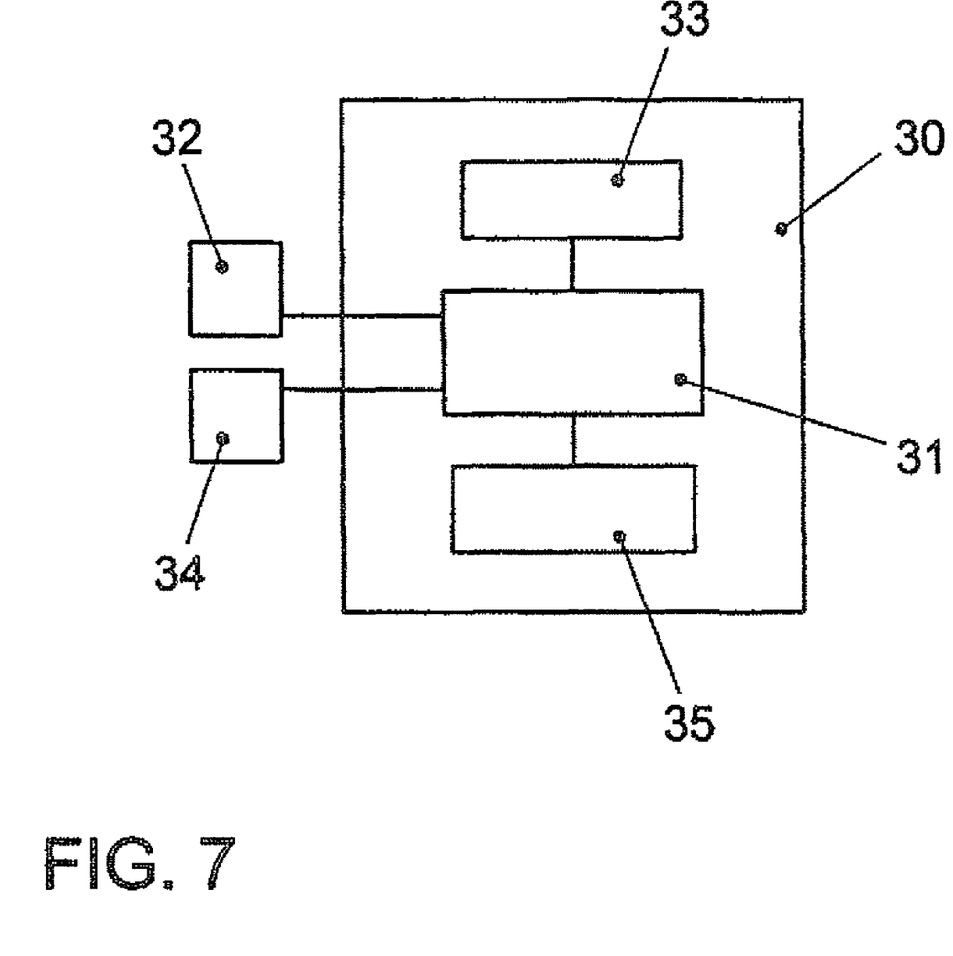
FIG. 7 is a schematic representation of a park-steering assistance system.

FIG. 7 shows a park-steering assistance system 30. Park-steering assistance system 30 includes a switch-on and switch-off logic 31. Switch-on and switch-off logic 31 is connected to a control element 32. A control signal generated by control element 32 may be evaluated by switch-on and switch-off logic 31 in order to switch a control unit 33 and thereby a park-steering assistance system 30 to an activated state. Switch-on and switch-off logic 31 is further coupled with a velocity sensor 34, from which switch-on and switch-off logic 31 receives a velocity signal that represents a velocity value of the vehicle. At least a first velocity threshold value and a second velocity threshold value are stored in a memory unit 35. Switch-on and switch-off logic 31 is arranged so that, when the velocity value of the motor vehicle exceeds the second velocity threshold value, it prompts control unit 33 of park-steering assistance system 30 to switch the park-steering assistance system to a temporarily deactivated state. If the velocity value exceeds the first velocity threshold value, then control unit 33 is prompted to deactivate park-steering assistance system 30. Additional velocity threshold values may be stored in memory unit 35 and switch-on and switch-off logic 31 may be arranged so as to implement a switch-on and switch-off functionality according to one of the exemplary embodiments described above or another combination of the individually described features.

What is claimed is:

1. A park-steering assistance system adapted to providing a driver with at least one of (a) assistance functions and/or (b) services in connection with driving a motor vehicle at least one of (a) into and/or (b) out of a parking space, comprising:
   a switch-on and switch-off logic adapted to switch the park-steering assistance system to an activated state as a function of a signal of a control device and to switch the park-steering assistance system to a deactivated state as a function of a velocity value of the motor vehicle and as a function of a specified first velocity threshold value;
   wherein the switch-on and switch-off logic is adapted to switch the park-steering assistance system at least one of (a) from the activated state to a temporarily deactivated state and/or (b) from the temporarily deactivated state to the activated state as a function of a comparison of the velocity value and a second velocity threshold value, the second velocity threshold value smaller than the first velocity threshold value.

2. A park-steering assistance system, park-steering assistance system adapted to providing a driver with at least one of (a) assistance functions and/or (b) services in connection with driving a motor vehicle at least one of (a) into and/or (b) out of a parking space, comprising:
  a switch-on and switch-off logic adapted to switch the park-steering assistance system to an activated state as a function of a signal of a control device and to switch the park-steering assistance system to a deactivated state as a function of a velocity value of the motor vehicle and as a function of a specified first velocity threshold value;
  wherein the switch-on and switch-off logic is adapted to switch the park-steering assistance system at least one of (a) from the activated state to a temporarily deactivated state and/or (b) from the temporarily deactivated state to the activated state as a function of a comparison of the velocity value and a second velocity threshold value, the second velocity threshold value smaller than the first velocity threshold value; and
  wherein the switch-on and switch-off logic is adapted to switch the park-steering assistance system from the temporarily deactivated state to the activated state only if the velocity value is also smaller than a third velocity threshold value, the third velocity threshold value smaller than the second velocity threshold value.

3. A park-steering assistance system, park-steering assistance system adapted to providing a driver with at least one of (a) assistance functions and/or (b) services in connection with driving a motor vehicle at least one of (a) into and/or (b) out of a parking space, comprising:
  a switch-on and switch-off logic adapted to switch the park-steering assistance system to an activated state as a function of a signal of a control device and to switch the park-steering assistance system to a deactivated state as a function of a velocity value of the motor vehicle and as a function of a specified first velocity threshold value;
  wherein the switch-on and switch-off logic is adapted to switch the park-steering assistance system at least one of (a) from the activated state to a temporarily deactivated state and/or (b) from the temporarily deactivated state to the activated state as a function of a comparison of the velocity value and a second velocity threshold value, the second velocity threshold value smaller than the first velocity threshold value; and
  wherein the switch-on and switch-off logic is adapted to switch the park-steering assistance system from the activated state to a state activated in a limited manner if the velocity value at least one of (a) reaches and/or (b) exceeds a fourth velocity threshold value, the fourth velocity threshold value smaller than the second velocity threshold value.

4. The park-steering assistance system according to claim 3, wherein the switch-on and switch-off logic is adapted so that the switch from the temporarily deactivated state to at least one of (a) the activated state and/or (b) the state activated in a limited manner occurs only if the velocity value falls below at least one of (a) the second velocity threshold value and/or (b) a third velocity threshold value, smaller than the second velocity threshold value, for a time span that is longer than a second time interval.

5. A park-steering assistance system, park-steering assistance system adapted to providing a driver with at least one of (a) assistance functions and/or (b) services in connection with driving a motor vehicle at least one of (a) into and/or (b) out of a parking space, comprising:
  a switch-on and switch-off logic adapted to switch the park-steering assistance system to an activated state as a function of a signal of a control device and to switch the park-steering assistance system to a deactivated state as a function of a velocity value of the motor vehicle and as a function of a specified first velocity threshold value;
  wherein the switch-on and switch-off logic is adapted to switch the park-steering assistance system at least one of (a) from the activated state to a temporarily deactivated state and/or (b) from the temporarily deactivated state to the activated state as a function of a comparison of the velocity value and a second velocity threshold value, the second velocity threshold value smaller than the first velocity threshold value; and
  wherein the switch-on and switch-off logic is adapted so that the switch to the deactivated state occurs only if the velocity value exceeds the first velocity threshold value during a time span that is longer than a first time interval.

6. A method for operating a park-steering assistance system having a switch-on and switch-off logic, comprising:
  detecting a control signal;
  switching the park-steering assistance system to an activated state upon receipt of the control signal;
  receiving a velocity signal that represents a velocity value of a motor vehicle;
  comparing the velocity value to a specified first velocity threshold value and switching the park-steering assistance system to a deactivated state as a function of a result of the comparison;
  comparing, by the switch-on and switch-off logic, the velocity value and a second velocity threshold value; and
  switching, by the switch-on and switch-off logic, the park-steering assistance system at least one of (a) from the activated state to a temporarily deactivated state and/or (b) from the temporarily deactivated state to the activated state as a function of the comparison;
  wherein the second velocity threshold value is smaller than the first velocity threshold value.

7. A method for operating a park-steering assistance system having a switch-on and switch-off logic, comprising:
  detecting a control signal;
  switching the park-steering assistance system to an activated state upon receipt of the control signal;
  receiving a velocity signal that represents a velocity value of a motor vehicle;
  comparing the velocity value to a specified first velocity threshold value and switching the park-steering assistance system to a deactivated state as a function of a result of the comparison;
  comparing, by the switch-on and switch-off logic, the velocity value and a second velocity threshold value; and
  switching, by the switch-on and switch-off logic, the park-steering assistance system at least one of (a) from the activated state to a temporarily deactivated state and/or (b) from the temporarily deactivated state to the activated state as a function of the comparison;
  wherein the second velocity threshold value is smaller than the first velocity threshold value;
  the method further comprising:
  comparing, by the switch-on and switch-off logic, the velocity value to a third velocity threshold value; and
  switching, by the switch-on and switch-off logic, the park-steering assistance system from the temporarily deactivated state to the activated state only if the velocity value is also smaller than a third velocity threshold value;
  wherein the third velocity threshold value is smaller than the second velocity threshold value.

8. A method for operating a park-steering assistance system having a switch-on and switch-off logic, comprising:
  detecting a control signal;

switching the park-steering assistance system to an activated state upon receipt of the control signal;
receiving a velocity signal that represents a velocity value of a motor vehicle;
comparing the velocity value to a specified first velocity threshold value and switching the park-steering assistance system to a deactivated state as a function of a result of the comparison;
comparing, by the switch-on and switch-off logic, the velocity value and a second velocity threshold value; and
switching, by the switch-on and switch-off logic, the park-steering assistance system at least one of (a) from the activated state to a temporarily deactivated state and/or (b) from the temporarily deactivated state to the activated state as a function of the comparison;
wherein the second velocity threshold value is smaller than the first velocity threshold value;
the method further comprising:
comparing, by the switch-on and switch-off logic, the velocity value to a fourth velocity threshold value; and
switching, by the switch-on and switch-off logic, the park-steering assistance system from the activated state to a state activated in a limited manner if the velocity value at least one of (a) reaches and/or (b) exceeds a fourth velocity threshold value;
wherein the fourth velocity threshold value is smaller than the second velocity threshold value.

9. The method according to claim 8, further comprising:
ascertaining, by the switch-on and switch-off logic, a time span during which the velocity value falls below at least one of (a) the second velocity threshold value and/or (b) a third velocity threshold value;
comparing, by the switch-on and switch-off logic, the ascertained time span to a second time interval; and
switching, by the switch-on and switch-off logic, the park-steering assistance system from the temporarily deactivated state to at least one of (a) the activated state and/or (b) the state activated in a limited manner only if the ascertained time span is longer than the second time interval;
wherein the third velocity threshold value is smaller than the second velocity threshold value.

10. A method for operating a park-steering assistance system having a switch-on and switch-off logic, comprising:
detecting a control signal;
switching the park-steering assistance system to an activated state upon receipt of the control signal;
receiving a velocity signal that represents a velocity value of a motor vehicle;
comparing the velocity value to a specified first velocity threshold value and switching the park-steering assistance system to a deactivated state as a function of a result of the comparison;
comparing, by the switch-on and switch-off logic, the velocity value and a second velocity threshold value; and
switching, by the switch-on and switch-off logic, the park-steering assistance system at least one of (a) from the activated state to a temporarily deactivated state and/or (b) from the temporarily deactivated state to the activated state as a function of the comparison;
wherein the second velocity threshold value is smaller than the first velocity threshold value;
the method further comprising:
ascertaining, by the switch-on and switch-off logic, a time span during which the velocity value at least one of (a) reaches and/or (b) exceeds the first velocity threshold value;
comparing, by the switch-on and switch-off logic, the ascertained time span to a first time interval; and
switching, by the switch-on and switch-off logic, the park-steering assistance system to the deactivated state only if the velocity value at least one of (a) reaches and/or (b) exceeds the first velocity threshold value during a time span that is longer than a first time interval.

* * * * *